United States Patent
McIntosh et al.

(10) Patent No.: US 6,905,650 B2
(45) Date of Patent: Jun. 14, 2005

(54) METHOD OF MAKING A VEHICLE FLOOR COVERING WITH INTEGRAL THREADED DRAIN TUBE

(75) Inventors: William Duncan McIntosh, Ontario (CA); Dayne Stuart Haight, Rochester Hills, MI (US)

(73) Assignee: Collins & Aikman Products Co., Troy, MI (US)

( * ) Notice: Subject to any disclaimer, the term of this patent is extended or adjusted under 35 U.S.C. 154(b) by 581 days.

(21) Appl. No.: 09/993,049

(22) Filed: Nov. 5, 2001

(65) Prior Publication Data

US 2002/0079621 A1 Jun. 27, 2002

Related U.S. Application Data

(62) Division of application No. 09/344,394, filed on Jun. 25, 1999, now Pat. No. 6,361,099.

(51) Int. Cl.[7] ............................................. B29C 51/10
(52) U.S. Cl. ....................... 264/554; 264/154; 264/163; 264/318; 425/388
(58) Field of Search ................................ 264/554, 154, 264/163, 318; 425/388

(56) References Cited

U.S. PATENT DOCUMENTS

| 1,649,734 | A | 11/1927 | Roberts et al. |
| 1,764,662 | A | 6/1930 | Tomlin |
| 2,032,832 | A | 3/1936 | Blair et al. |
| 2,258,238 | A | 10/1941 | Collins |
| 2,336,423 | A | 12/1943 | Rieser |
| 2,650,855 | A | 9/1953 | Peirce |
| 3,042,974 | A | 7/1962 | Gerstenmaier et al. |
| 3,050,329 | A | 8/1962 | Pagan |
| 3,061,888 | A | 11/1962 | Wadham |
| 3,082,032 | A | 3/1963 | Stata |
| 3,284,836 | A | 11/1966 | Ioppolo |
| 3,450,429 | A | 6/1969 | Stata |
| 4,280,976 | A | 7/1981 | Von Holdt |
| 4,508,771 | A | 4/1985 | Peoples, Jr. et al. |
| 4,579,764 | A | 4/1986 | Peoples, Jr. et al. |
| 5,322,335 | A | 6/1994 | Niemi |
| 5,518,679 | A | 5/1996 | Junk |
| 5,839,847 | A | * 11/1998 | Patel .......................... 403/269 |
| 6,001,294 | A | * 12/1999 | Inaba et al. ................. 264/278 |

FOREIGN PATENT DOCUMENTS

| JP | 57-178838 | * 11/1982 |
| JP | 62-220312 | * 9/1987 |
| JP | 2-155618 | * 6/1990 |
| JP | 03 284 432 | 12/1991 |
| JP | 07 010 039 | 1/1995 |
| JP | 08 156 669 | 6/1996 |

* cited by examiner

Primary Examiner—Edmund H. Lee
(74) Attorney, Agent, or Firm—Myers Bigel Sibley & Sajovec, P.A.

(57) ABSTRACT

A molded floor covering for a vehicle floor includes a thermoplastic polymer layer with an integral, threaded drain tube extending therefrom. The drain tube is configured such that a distal end thereof can extend through a drain hole in a vehicle floor when the floor covering is installed within a vehicle. The drain tube includes a threaded bore that is configured to receive a correspondingly-threaded drain plug therein. A method of producing a molded floor covering having an integrally formed, threaded drain tube includes providing a mold having a contour of a vehicle floor with an outwardly projecting threaded member. A layer of thermoplastic polymer is vacuum formed over the mold and around the threaded member such that the layer follows the contours of the mold and threaded member to form an elongate tube extending therefrom.

10 Claims, 4 Drawing Sheets

METHOD OF MAKING A VEHICLE FLOOR COVERING WITH INTEGRAL THREADED DRAIN TUBE

RELATED APPLICATION

This application is a Divisional application of U.S. patent application Ser. No. 09/344,394 filed Jun. 25, 1999, now U.S. Pat. No. 6,361,099.

FIELD OF THE INVENTION

The present invention relates generally to floor coverings and, more particularly, to floor coverings for vehicles.

BACKGROUND OF THE INVENTION

Vehicle manufacturers typically provide some type of covering for vehicle floors. Vehicle floor coverings are typically configured to provide a resilient and decorative wearing surface with heat insulating and sound deadening qualities. For example, the use of carpet as a vehicle floor covering is well known. Carpeting used to cover a vehicle floor is typically molded into a contoured configuration that conforms to the contour of a vehicle floor so as to fit properly. U.S. Pat. No. 4,579,764 to Peoples, Jr., et al. discloses an exemplary molded foam-backed carpet for use as a vehicle floor covering.

The use of molded thermoplastic polymer compositions as floor coverings for vehicles known as sport utility vehicles (SUVs), which recently have found growing popularity among consumers, is also known. U.S. Pat. No. 5,322,335 to Niemi discloses an exemplary molded floor covering for an SUV.

It is known that water can accumulate on the floors of passenger and cargo compartments of vehicles, particularly during inclement weather. Because of the potential for corrosion and other damage that may be caused by such water accumulation, drain holes are conventionally provided within vehicle floors to enable any collected water to drain out. In order to prevent the infiltration of noise and dirt within a vehicle during vehicle operation, these drain holes are conventionally fitted with removable plugs.

Many conventional floor coverings, particularly floor coverings for SUVs, are formed from material that is impervious to water. As a result, water that accumulates on a vehicle floor covering may be prevented from draining from the vehicle via drains provided within the vehicle floor. Accordingly, there is a need for providing a mechanism that allows water to drain directly through vehicle floor coverings.

SUMMARY OF THE INVENTION

In view of the above, it is an object of the present invention to facilitate drainage of water from within a vehicle directly through a vehicle floor covering.

It is another object of the present invention to provide a method of producing vehicle floor coverings having drains integrally formed therewith.

These and other objects of the present invention are provided by a molded floor covering for a vehicle floor that includes a thermoplastic polymer layer with a contoured configuration adapted to conform to the contour of a vehicle floor and an integral, threaded drain tube extending outwardly therefrom. The drain tube extends outwardly from the thermoplastic polymer layer and includes an open proximate end, an open distal end and a threaded cylindrical bore. The open proximate end is integrally formed with the thermoplastic polymer layer and the distal end is configured to extend through an aperture in a vehicle floor when the floor covering is installed within a vehicle.

A drain plug including a head and a threaded shank connected to the head is configured to be inserted within the drain tube. The threaded shank is configured to threadingly engage the threaded cylindrical bore such that the drain plug can be inserted and removed via rotation about the axial direction. Preferably, the drain plug head and the drain tube proximate end have respective conical frustum shapes such that the drain plug head can be received by the proximate end in countersunk relation therewith. Furthermore, it is preferable that the drain plug head include a portion that can be engaged by a tool or grasped by a user to rotate the drain plug about the axial direction.

According to another aspect of the present invention, a method is provided for producing a molded floor covering for a vehicle floor that includes a drain tube integrally formed therewith. A mold having a contour of a vehicle floor is provided with an outwardly projecting threaded member. The threaded member includes a head portion and an elongate threaded shank. A layer of thermoplastic polymer is vacuum formed over the mold and around the threaded member such that the layer follows the contours of the mold and threaded member to produce a molded floor covering having opposite first and second surfaces, and a drain tube extending outwardly therefrom. The drain tube includes a threaded bore that is configured to receive a correspondingly-threaded drain plug. The drain tube includes an open proximate end and a closed distal end. The open proximate end is integrally formed with the molded floor covering.

According to another embodiment of the present invention, a fastener may threadingly engage an elongate threaded tube integrally formed with a floor covering according to the above described method to removably secure a mat to the floor covering.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
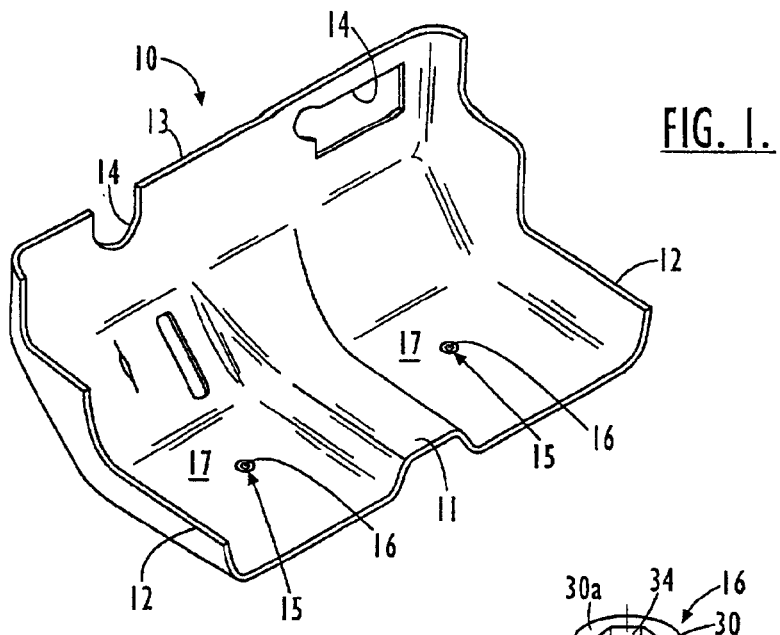
FIG. 1 is a perspective view showing an exemplary molded floor covering assembly for a vehicle incorporating an integral drain in accordance with the invention.

Referring now specifically to FIG. 1, reference character 10 generally indicates a vehicle floor covering incorporating a drain 15 in accordance with the invention. The floor covering 10 illustrated in FIG. 1 has a nonplanar three dimensional molded configuration adapted to fit the front seat compartment floor of a vehicle and includes a raised medial portion 11 adapted to conform to the transmission hump, generally vertically extending side portions 12 adapted to fit beneath each door opening, and a front portion 13 adapted to fit along the inclined floorboard and vertical firewall areas of a vehicle. Various openings or cut-outs are provided, as indicated at 14, to receive air conditioning equipment, the steering column, pedals and the like. Drains 15 having removable plugs 16 secured therewithin according to the invention are provided in selected low point areas 17 of the floor covering 10. It is to be understood that the particular three dimensional configuration illustrated is merely for purposes of illustration. Vehicle floor coverings incorporating drains according to the present invention may have various configurations and shapes depending on the floor configuration of a vehicle.

Figure 2:
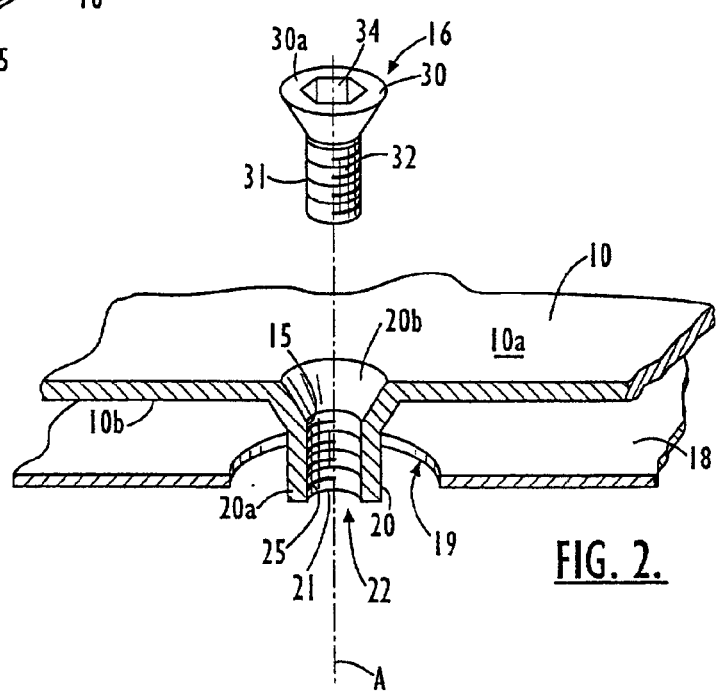
FIG. 2 is an exploded, cutaway view of a portion of the floor covering of FIG. 1 having an integral drain and plug therein according to the invention.

Referring now to FIG. 2, an exploded, cutaway view of a portion of the floor covering 10 having a drain 15 and plug 16 therein, according to the invention, is illustrated. The floor covering 10 includes an exposed surface 10a and an opposite underside surface 10b. When the floor covering 10 is installed in a vehicle, the underside surface 10b is configured to make contacting relationship with the vehicle floor 18. As would be understood by one of skill in the art, the floor covering 10 may be secured to the floor 18 via adhesives and/or fasteners.

The illustrated drain 15 includes a drain tube 20 that is integrally formed with the floor covering 10 and that extends downwardly from the underside surface 10b of the floor covering 10. The drain tube 20 is configured to extend through an aperture 19 formed within the vehicle floor 18 when the floor covering 10 is installed within a vehicle.

The drain tube 20 includes a cylindrical inner wall 21 that defines a cylindrical bore 22 that extends along an axial direction A. The cylindrical bore 22 extends from an open proximate end 20b to an open distal end 20a, as illustrated. The illustrated proximate end 20b has a conical frustum shape that is configured to receive a correspondingly-shaped head of the plug 16 in countersunk relation therewith. The drain tube cylindrical inner wall 21 includes a set of threads 25 which are configured to threadingly receive a correspondingly threaded shank 31 of the plug 16.

Figure 9:
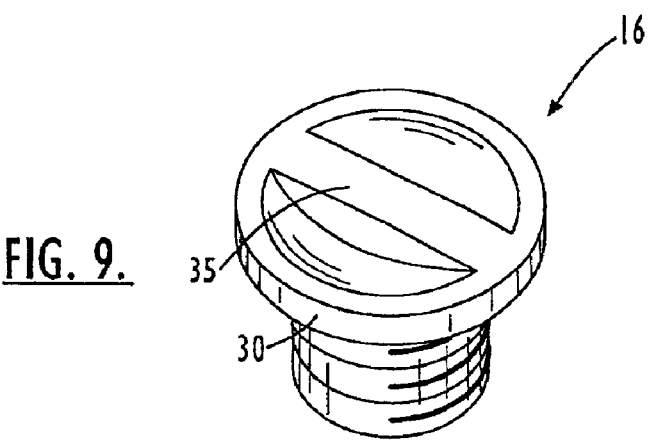
FIG. 9 is a perspective view of a drain plug having a handle that facilitates removal of the drain plug by hand.

Still referring to FIG. 2, the plug 16 has a head portion 30 with an aperture 34 configured to receive a tool for applying torque thereto and a circular, threaded shank portion 31. It is understood that the head portion 30 may have various configurations. For example, the head portion 30 may include a handle (35, FIG. 9) that facilitates removal of the plug 16 by hand, without the need for a tool. Also, projections extending from the head portion 30, as well as apertures, may serve as means for engaging a tool that is configured to rotate the drain plug 16. The plug 16 may be formed from various materials including, but not limited to, metals, plastics and rubber. Preferably, the plug 16 is formed from plastic or rubber to facilitate easy removal by hand without the need for a removal tool.

The head portion 30 has a conical frustum shape and includes a substantially flat end portion 30a. Accordingly, when the plug 16 is secured within the drain 15, the plug head portion 30 is countersunk within the proximate end 20b such that the end portion 30a is substantially flush with the exposed surface 10a of the floor covering, as illustrated in FIG. 3.

The threads 32 on the shank are configured to threadingly engage with the threads 25 in the drain tube cylindrical inner wall 21 such that when torque is applied to the plug head portion 30, the plug 16 moves along the axial direction A within the drain tube 20. Preferably, rotation of the plug 16 in a clockwise direction causes the plug 16 to move along the axial direction A so that the plug head portion 30 moves towards the inlet 23. Conversely, rotation of the plug 16 in a counter-clockwise direction causes the plug 16 to move along the axial direction A so that the plug head portion 30 moves away from the inlet 23.

Figure 3:
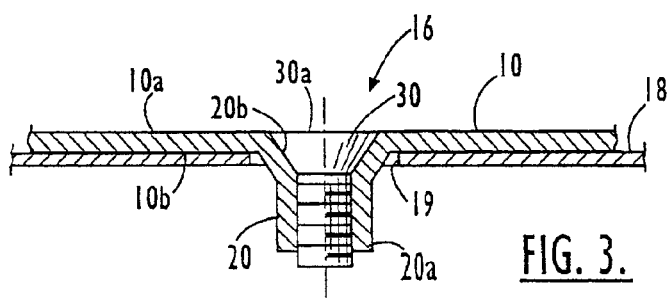
FIG. 3 is a side section view of a portion of the floor covering of FIG. 1 illustrating the plug in a secured position within the drain tube.

FIG. 3 illustrates the plug 16 in a secured position within the drain tube 20. To remove water that has accumulated on the floor covering exposed surface 10a, the plug 16 is rotated in a counter-clockwise direction which threadingly disengages the threaded shank 31 from the threaded bore 22, thereby allowing the plug 16 to be removed from the drain 15. The accumulated water can then drain from the vehicle through the drain tube 20. After the water is drained from the vehicle, the plug 16 is returned to a secured position within the drain 15 as illustrated in FIG. 3.

Figure 4:
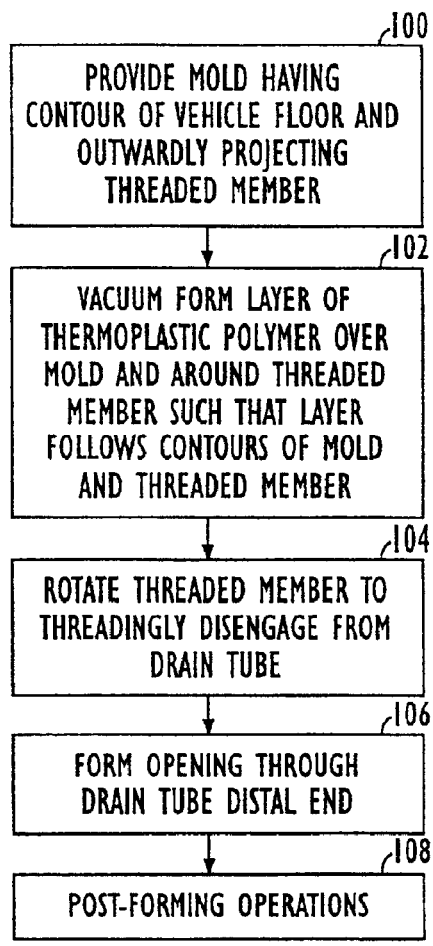
FIG. 4 illustrates method steps for producing molded floor coverings according to the present invention.
Figure 5:
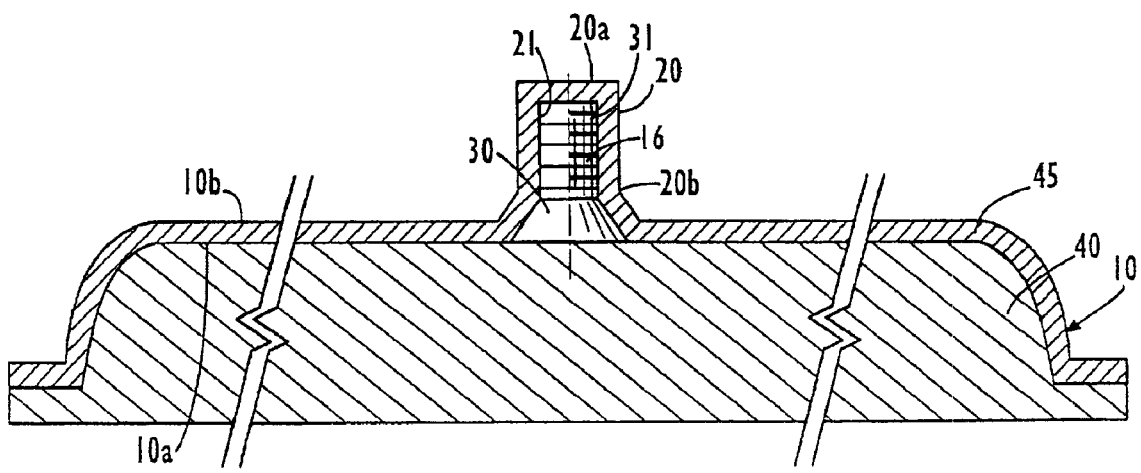
FIG. 5 is a side section view of a layer of thermoplastic polymer being vacuum formed over a mold and around a threaded member in accordance with the present invention.

Referring now to FIGS. 4 and 5, a method of producing a molded floor covering for a vehicle floor, wherein the molded floor covering includes a drain tube integrally formed therewith according to the present invention is illustrated. A mold having a contour of a vehicle floor is provided with an outwardly projecting threaded member (Block 100). A metal bolt is preferably utilized as the threaded member. FIG. 5 is a section view of a mold 40 having a contour of a vehicle floor. An outwardly projecting threaded member 16 is also provided, as illustrated. The illustrated threaded member 16 has a head portion 30 with a conical frustum shape and an elongate threaded shank 31.

A layer of thermoplastic polymer is then vacuum formed over the mold and around the threaded member such that the layer follows the contours of the mold and threaded member (Block 102). Various polymers or copolymers may be suitably employed as the thermoplastic polymer such as, for example, polymers or copolymers of ethylene with ethylenically unsaturated monomers; fillers; polyolefin polymers such as polyethylene or polypropylene; polyvinyl chloride;

styrenebutadiene mixed polymers and mixtures of these materials with other thermoplastic polymers. A preferred thermoplastic polymer is ethylene/vinyl acetate copolymer. The polymer may include conventional fillers, plasticizers, processing aids, flame retardants, etc., the selection of which is within the skill of one in the art.

As illustrated in FIG. 5, the layer of thermoplastic polymer 45 has been formed via mold 40 to produce a molded floor covering 10 having opposite first and second surfaces 10a, 10b and a drain tube 20 extending outwardly therefrom. The drain tube 20 includes a threaded bore 21 with an open proximate end 20b and a closed distal end 20a. The open proximate end 20b is integrally formed with the molded floor covering 10. In the illustrated embodiment, the open proximate end 20b has a conical frustum configuration matching that of the head 30 of the threaded member 16.

Figure 6:
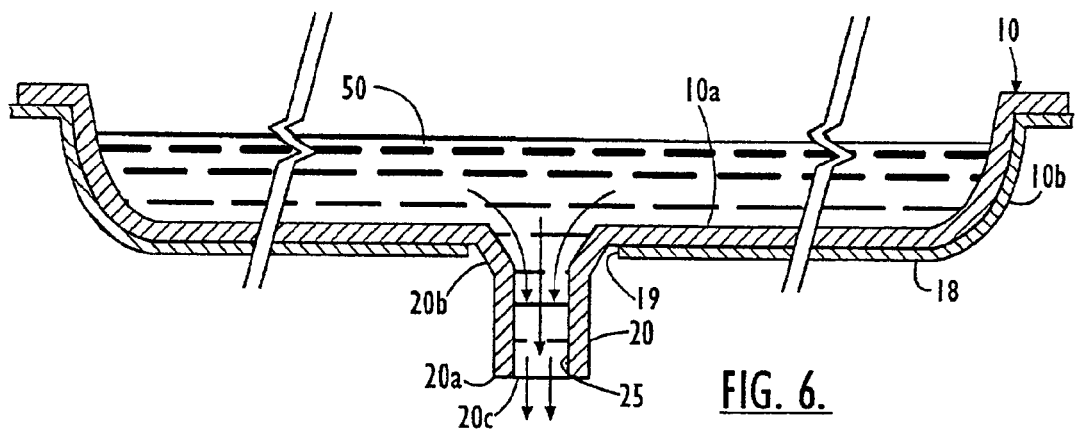
FIG. 6 is a side section view of a molded vehicle floor covering wherein water is shown draining through the drain tube.

Next, the threaded member is rotated to threadingly disengage the threaded member from the drain tube (Block 104). An opening is then formed through the drain tube distal end (Block 106). Accordingly, fluid, such as water 50, can drain from the molded floor covering first surface 10a by flowing into the open proximate end 20b, through the drain tube 20, and out the open distal end 20a, as illustrated in FIG. 6. Preferably, a plastic threaded bolt is threadingly engaged with the drain tube to serve as the drain tube plug. Preferably, the plastic threaded bolt has a handle (35, FIG. 9) to allow users to manually rotate the plastic bolt in order to threadingly disengage the plastic bolt from the drain tube.

Additional post-forming operations may be performed on the floor covering (Block 108). Such operations may include, but are not limited to, the addition of padding to the underside surface 10b of the molded floor covering 10 for providing cushioning, sound deadening, and thermal insulation, and the addition of carpeting to the exposed surface 10a of the molded floor covering 10.

As would be known to one of skill in the art, padding may be formed from relatively inexpensive fibers such as jute or recycled waste fibers, and may be precut into predetermined desired shapes and bonded to the underside surface 10b of the floor covering 10. Carpeting added to the exposed surface may suitably be of tufted, woven, knitted, or nonwoven construction in accordance with known methods of carpet manufacture.

Figure 7A:
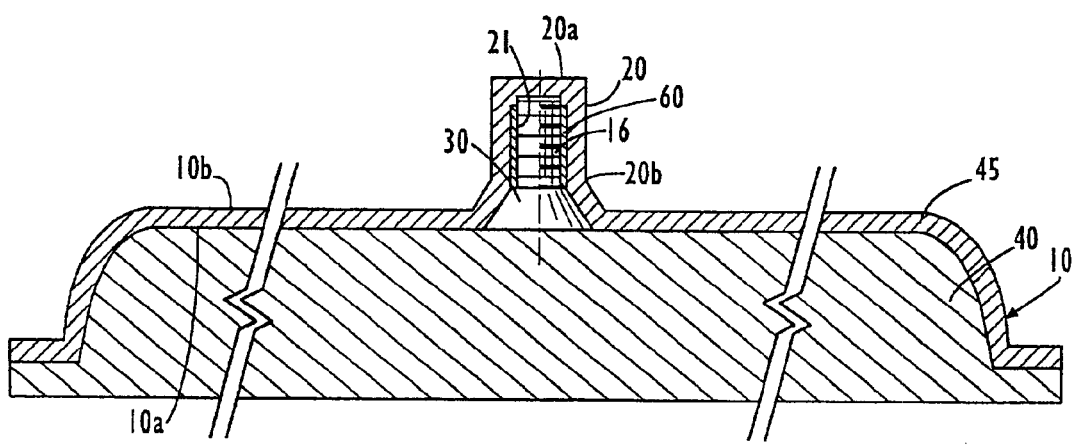
FIG. 7A is a side section view of a layer of thermoplastic polymer being vacuum formed over a mold and around a threaded member having a threaded insert in accordance with another embodiment of the present invention.
Figure 7B:
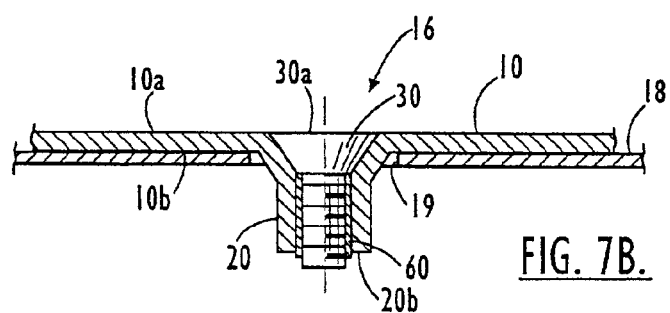
FIG. 7B illustrates the plug of FIG. 7A in a secured position threadingly engaged with the threaded insert within the drain tube.

Referring now to FIGS. 7A and 7B, another embodiment of the present invention is illustrated. A threaded sleeve 60 is threadingly engaged with the threaded member 16 prior to forming the molded floor covering 10. The purpose of the threaded sleeve 60 is to eliminate the potential for stripping and other thread damage during and after the molding process. In the illustrated embodiment, the layer of thermoplastic polymer 45 has been formed via mold 40 to produce a molded floor covering 10 having opposite first and second surfaces 10a, 10b and a drain tube 20 extending outwardly therefrom. The drain tube 20 includes an open proximate end 20b and a closed distal end 20a. The threaded insert 60 is integrally formed with the layer of thermoplastic polymer 45. The threaded insert 60 may include outwardly projecting members, such as ribs or threads, on the outer surface thereof to facilitate bonding with the floor covering 10 during formation of the elongate tube 20. FIG. 7B illustrates the plug 16 in a secured position threadingly engaged with the threaded insert 60 within the drain tube 20.

Figure 8:
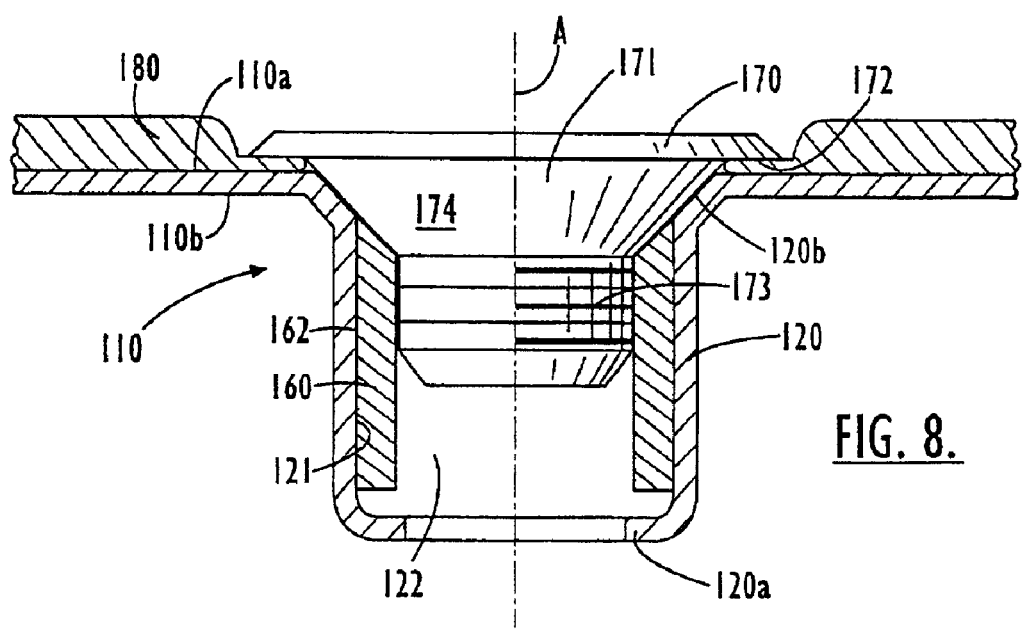
FIG. 8 is a side section view of a molded floor covering for a vehicle floor according to another embodiment of the present invention wherein the floor covering includes an elongate tube and a fastener for securing a mat to the floor covering.

Referring now to FIG. 8, a molded floor covering 110 for a vehicle floor, according to another embodiment of the present invention is illustrated. The floor covering 110 has opposite first and second surfaces 110a, 110b, and an elongate tube 120 extending outwardly therefrom, as illustrated. The elongate tube 120 includes a distal end 120a and an open proximate end 120b with a cylindrical inner wall 121 that defines a cylindrical bore 122 having an axial direction A extending from the open proximate end 120b to the distal end 120a. The open proximate end 120b is integrally formed with the floor covering 110 and the elongate tube 120 is configured such that the distal end 120a can extend through an aperture (not shown) within a vehicle floor.

Preferably, a threaded insert 160 is integrally formed with the cylindrical inner wall 121 within the cylindrical bore 122 as illustrated. The threaded insert 160 may include outwardly projecting members, such as ribs or threads, on the outer surface 162 thereof to facilitate bonding with the floor covering 110 during formation of the elongate tube 120. A fastener 170 that is configured to compressively engage a portion of a mat 180 disposed on the floor covering 110 is threadingly engaged with the threaded insert 160. The fastener 170 includes a head 171 having a circumferentially extending shoulder 172 that is configured to compressively engage a portion of the mat 180 disposed on the floor covering 110. The fastener 170 also includes a threaded shank 173 that is connected to the head 171 and that is configured to threadingly engage the threaded insert 160.

In the illustrated embodiment, the fastener 170 also includes neck portion 174 between the head 171 and the threaded shank 173. The fastener neck portion 174 has a conical frustum shape. The proximate end 120b of the elongate tube 120 has a corresponding conical frustum shape that is configured to receive the neck portion 174 in countersunk relation therewith, as illustrated. The fastener 170 allows a mat to be quickly secured to and removed from the floor covering 110.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of producing a molded floor covering for a vehicle floor, wherein the molded floor covering includes a drain tube integrally formed therewith, wherein the drain tube includes a threaded bore that is configured to receive a correspondingly-threaded plug, the method comprising the steps of:

providing a mold having a contour of the vehicle floor and an outwardly projecting threaded member, wherein the threaded member includes a head portion and an elongate threaded shank;

vacuum forming a layer of thermoplastic polymer over the mold and around the threaded member such that the layer follows the contours of the mold and threaded member to produce a molded floor covering having opposite first and second surfaces, and a drain tube extending outwardly therefrom, wherein the drain tube includes a threaded bore with an open proximate end and a closed distal end, wherein the open proximate end is integrally formed with the molded floor covering, and wherein the open proximate end has a configuration of the head of the threaded member;

rotating the threaded member to threadingly disengage the threaded member from the drain tube; and forming an opening through the drain tube distal end.

2. A method according to claim 1 wherein the threaded member head portion has a conical frustum shape.

3. A method according to claim 1 wherein the thermoplastic polymer is an ethylene/vinyl acetate copolymer.

4. A method according to claim 1 further comprising the step of disposing a carpet having a fibrous surface on the first surface of the molded floor covering.

5. A method according to claim 1 further comprising the step of disposing padding on the second surface of the molded floor covering.

6. A method of producing a molded floor covering for a vehicle floor, wherein the molded floor covering includes a drain tube integrally formed therewith, wherein the drain tube includes a bore that is configured to receive a removable plug, the method comprising the steps of:

providing a mold having a contour of the vehicle floor and an outwardly projecting threaded member, wherein the threaded member includes a head portion, an elongate threaded shank, and a cylindrical threaded insert threadingly engaged with the threaded member along a portion of the elongate threaded shank;

vacuum forming a layer of thermoplastic polymer over the mold and around the threaded member and threaded insert such that the layer follows the contours of the mold, threaded member and threaded insert to produce a molded floor covering having opposite first and second surfaces, and a drain tube extending outwardly therefrom, wherein the drain tube includes a bore with an open proximate end and a closed distal end, wherein the open proximate end is integrally formed with the molded floor covering, wherein the threaded insert is integrally formed within the cylindrical bore, and wherein the open proximate end has a configuration of the head of the threaded member;

rotating the threaded member to threadingly disengage the threaded member from the threaded insert within the drain tube; and forming an opening through the drain tube distal end.

7. A method according to claim 6 wherein the threaded member head portion has a conical frustum shape.

8. A method according to claim 6 wherein the thermoplastic polymer is an ethylene/vinyl acetate copolymer.

9. A method according to claim 6 further comprising the step of disposing a carpet having a fibrous surface on the first surface of the molded floor covering.

10. A method according to claim 6 further comprising the step of disposing padding on the second surface of the molded floor covering.

* * * * *